United States Patent
Gadiraju et al.

(10) Patent No.: US 10,958,200 B1
(45) Date of Patent: Mar. 23, 2021

(54) SYSTEM AND METHOD FOR OPERATING A WIND TURBINE POWER SYSTEM DURING LOW WIND SPEEDS TO IMPROVE EFFICIENCY

(71) Applicant: General Electric Company, Schenectady, NY (US)

(72) Inventors: Kasi Viswanadha Raju Gadiraju, Bangalore (IN); Deepak Raj Sagi, Bangalore (IN); Rajni Kant Burra, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/552,062

(22) Filed: Aug. 27, 2019

(51) Int. Cl.
| | | |
|---|---|---|
| H02P 9/10 | (2006.01) | |
| F03D 17/00 | (2016.01) | |
| F03D 7/02 | (2006.01) | |
| F03D 7/04 | (2006.01) | |
| H02J 3/38 | (2006.01) | |
| H02P 9/00 | (2006.01) | |
| F03D 9/11 | (2016.01) | |
| F03D 1/00 | (2006.01) | |
| H02P 101/15 | (2016.01) | |

(52) U.S. Cl.
CPC .............. H02P 9/105 (2013.01); F03D 7/028 (2013.01); F03D 7/048 (2013.01); F03D 17/00 (2016.05); H02J 3/386 (2013.01); H02P 9/007 (2013.01); H02P 9/008 (2013.01); *F03D 1/00* (2013.01); *F03D 9/11* (2016.05); *F05B 2270/1033* (2013.01); *F05B 2270/20* (2013.01); *F05B 2270/32* (2013.01); *H02P 2101/15* (2015.01)

(58) Field of Classification Search
CPC .......... H02P 9/105; H02P 9/007; H02P 9/008; H02P 2101/15; F03D 17/00; F03D 7/028; F03D 7/048; F03D 9/11; F03D 1/00; H02J 3/386; F05B 2270/1033; F05B 2270/20; F05B 2270/32
See application file for complete search history.

(56) References Cited

U.S. PATENT DOCUMENTS 7,629,702 B2  12/2009  Schubert
9,617,976 B2   4/2017  Edenfeld
(Continued)

OTHER PUBLICATIONS

European Search Report, dated Feb. 3, 2021, for EP Application No. 20193184.7.

*Primary Examiner* — Tulsidas C Patel
*Assistant Examiner* — Joseph Ortega
(74) *Attorney, Agent, or Firm* — Dority & Manning, P.A.

(57) ABSTRACT

A method for operating a wind turbine power system that supplies real and reactive power to a grid includes operating a generator of the wind turbine power system up to a first speed limit. The method also includes monitoring a wind speed at the wind turbine power system. When the wind speed drops below a predetermined threshold, the method includes reducing the first speed limit of the generator to a reduced speed limit of the generator. Further, the method includes operating the generator at the reduced speed limit for as long as the wind speed remains below the predetermined threshold so as to optimize a tip-speed-ratio of the wind turbine power system during low wind speeds, thereby increasing power production of the wind turbine power system at low wind speeds.

18 Claims, 6 Drawing Sheets

(56) References Cited

U.S. PATENT DOCUMENTS

| | | | |
|---|---|---|---|
| 2016/0177923 A1* | 6/2016 | Edenfeld | F03D 9/25 290/44 |
| 2016/0305402 A1 | 10/2016 | Caponetti et al. | |
| 2019/0170120 A1* | 6/2019 | Hald | F03D 7/048 |

* cited by examiner

SYSTEM AND METHOD FOR OPERATING A WIND TURBINE POWER SYSTEM DURING LOW WIND SPEEDS TO IMPROVE EFFICIENCY

FIELD

The present disclosure relates generally to wind turbines and, more particularly, to a system and method for operating wind turbine power systems during low wind speeds to optimize the tip-speed-ratio (TSR), thereby improving annual energy production (AEP).

BACKGROUND

Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. Each of the RSC and the LSC typically includes a bank of pulse width modulated switching devices, for example insulated gate bipolar transistors (IGBT modules). The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it is possible to adjust the reactive power (and real power) fed to the grid from the RSC independently of the rotational speed of the generator. In addition, the generator is able to import or export reactive power, which allows the system to support the grid during extreme voltage fluctuations on the grid.

Typically, the amount of reactive power to be supplied by a wind farm to the grid during steady-state and transient states is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and line-side reactive power).

In general, the minimum speed (i.e. the cut-in speed) of the DFIG is decided based on the voltage limit imposed by the RSC. Lowering or extending the minimum speed of the turbine increases the operating slip of the DFIG, which mandates the RSC to operate at a higher voltage. In addition to the minimum turbine speed, the reactive power requirement from the DFIG also effects the voltage at the terminals of the RSC. Further, as mentioned, most of the grid codes demand rated reactive power support during the entire operation of the wind turbine, i.e. from cut-in speed to rated speed. Providing the rated reactive power at the minimum turbine speed further forces the RSC to operate at a higher voltage.

During low wind speeds (e.g. from about 3 meter/second (m/s) to about 5 m/s), the wind turbine is supposed to rotate at minimum speed limit. To oblige this, the turbine controller commands to DFIG to operate at a higher TSR (beyond the optimal value). Operation of the wind turbine at the higher TSR, however, is not efficient and will result in wasted energy.

Thus, an improved system and method for operating a wind turbine power system during low wind speeds to allow for a lower or optimized TSR, thereby improving AEP would be desirable in the industry.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine power system that supplies real and reactive power to a grid. The wind turbine power system includes a generator coupled to a power converter. The method includes operating the generator of the wind turbine power system up to a first speed limit. The method also includes monitoring a wind speed at the wind turbine power system. When the wind speed drops below a predetermined threshold, the method includes reducing the first speed limit of the generator to a reduced speed limit of the generator. Further, the method includes operating the generator at the reduced speed limit for as long as the wind speed remains below the predetermined threshold so as to optimize a tip-speed-ratio of the wind turbine power system during low wind speeds, thereby increasing power production of the wind turbine power system at low wind speeds. In other words, at low wind speeds, the TSR is typically greater than an optimal TSR; therefore, reducing the speed limit of the generator reduces the TSR to a TSR closer to the optimum value.

In one embodiment, the predetermined threshold may include wind speeds up to about 5 meters/second (m/s). In another embodiment, the reduced speed limit may range from about 85% to about 95% of the first speed limit. In further embodiments, reducing the first speed limit of the generator to the reduced speed limit of the generator increases a power coefficient of the wind turbine power system during the low wind speeds.

In additional embodiments, reducing the first speed limit of the generator to the reduced speed limit of the generator further comprises transferring at least a portion of the reactive power to a reactive power compensation device. In such embodiments, the power converter may include, for example, a line-side converter and a rotor-side converter, the reactive power compensation device comprising at least one of the line-side power converter, a VAR box, or an electrical balance of plant at a point of interconnection of the wind turbine power system.

In several embodiments, the generator may be a doubly fed induction generator (DFIG). In another embodiment, the wind turbine power system may be one of a plurality of wind turbine power systems within a wind farm that supplies the real and reactive power to the grid. In such embodiments, all or a plurality of the wind turbine power systems may be connected to a common collection bus within the wind farm.

In another aspect, the present disclosure is directed to a wind turbine power system configured to supply real and reactive power to a grid. The wind turbine power system includes a wind turbine having a rotor. The rotor has a hub with a plurality of blades coupled thereto. The wind turbine also includes a generator coupled to the rotor and a power converter coupled to the generator. The wind turbine power system further includes a controller for controlling operation of the wind turbine. The controller includes at least one processor configured to perform a plurality of operations, including but not limited to operating the generator of the wind turbine up to a first speed limit, monitoring a wind speed at the wind turbine, when the wind speed drops below a predetermined threshold, reducing the first speed limit of the generator to a reduced speed limit of the generator, and operating the generator at the reduced speed limit for as long as the wind speed remains below the predetermined threshold so as to optimize a tip-speed-ratio of the wind turbine during low wind speeds, thereby increasing power production of the wind turbine at low wind speeds.

In yet another aspect, the present disclosure is directed to a method for operating a wind turbine power system that supplies real and reactive power to a grid. The wind turbine power system includes a doubly fed induction generator (DFIG) coupled to a power converter. The method includes monitoring a wind speed at the wind turbine power system. When the wind speed drops below a predetermined threshold, the method includes reducing a speed limit of the DFIG by a predetermined amount. Further, the method includes maintaining the reduced speed limit for as long as the wind speed remains below the predetermined threshold so as to reduce a tip-speed-ratio of the wind turbine power system during low wind speeds, thereby increasing power production of the wind turbine power system at low wind speeds.

It should be understood that the methods and systems may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
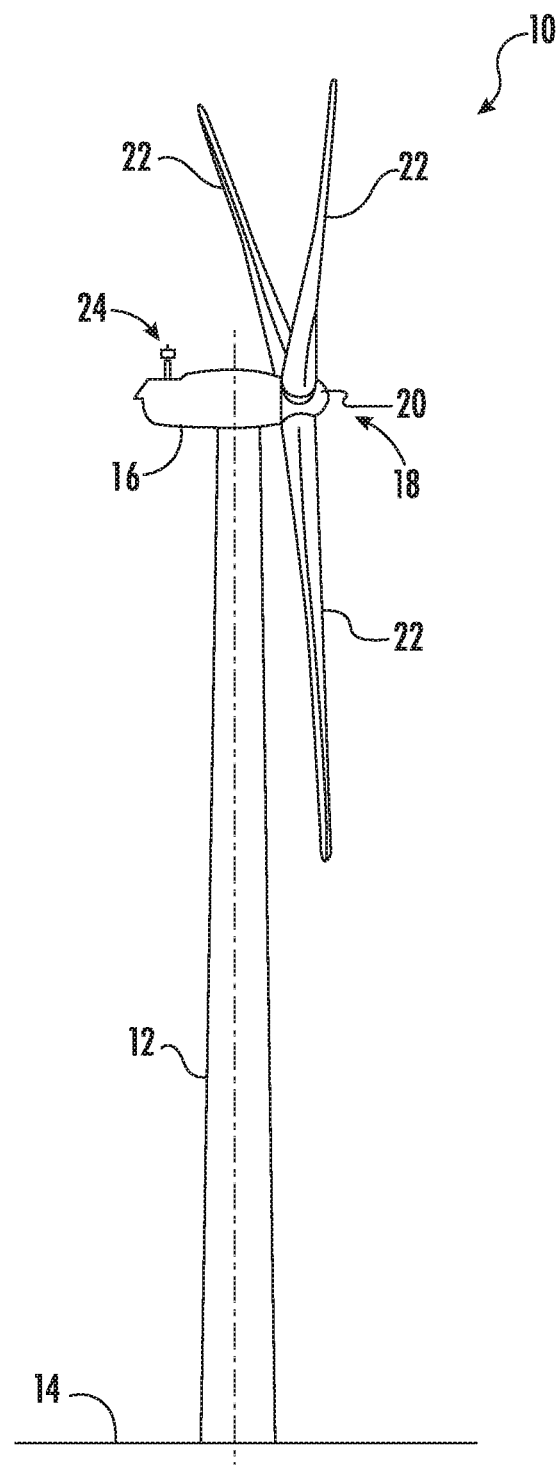
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

In general, as discussed above, the present disclosure is directed to a system and method for operating a wind turbine having a generator, such as a doubly fed induction generator system (DFIG), coupled to a power converter. As such, the DFIG may be operated up to a first speed limit. During this time, one or more sensors may monitor a wind speed at the wind turbine. When the wind speed drops below a predetermined threshold, the first speed limit of the DFIG may be reduced to a reduced speed limit and maintained at the reduced speed limit for as long as the wind speed remains below the predetermined threshold. As such, the tip-speed-ratio of the wind turbine is optimized during low wind speeds, thereby increasing power production of the wind turbine at low wind speeds. At low wind speeds, the TSR is typically greater than an optimal TSR; therefore, reducing the speed limit of the generator reduces the TSR to a TSR closer to the optimum value.

Accordingly, the present disclosure aims to improve the operational power coefficient ($C_p$) of the wind turbine during low wind speeds by extending the minimum speed of the wind turbine. By transferring the reactive power to the line-side converter (LSC), a VAR box, and/or an eBOP at the generator/point of interconnection, the minimum speed limit of the wind turbine can be extended. In addition, by lowering the minimum speed limit, the wind turbine can be operated at an optimized TSR and pitch angle during low wind speeds, thereby improved turbine efficiency.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy. One or more wind conditions, such as wind speed and/or wind direction may also be monitored via a wind sensor 24, such as an anemometer, located on the nacelle 16 or any other suitable location near the wind turbine 10.

Wind power generation is typically provided by a wind farm having a large number (often 100 or more) of the wind turbines 10 with associated wind turbine generators 120 (FIG. 2), wherein each individual wind turbine 10 typically experiences a unique wind force. Accordingly, the output power for each individual wind turbine generator 120 may vary from one wind turbine 10 to another wind turbine 10 within the wind farm.

As is generally understood, active power and reactive power are provided by each wind turbine generator 120. In some embodiments, a farm-level controller provides reactive power commands (Qcmd) to the wind turbine generators 120, based on transmission grid needs (which may be dictated by the grid operator or determined based on grid voltage). The reactive power demand may be identical for each wind turbine generator. In an alternate control methodology, the reactive power commands may be individually tailored to the wind turbine generators 120 in the wind farm based on the different power generation characteristics of the respective wind turbine generators 120. It should be appreciated that the present invention is not limited to the manner or methodology in which the reactive power command for an individual wind turbine generator 120 is generated.

Figure 2:
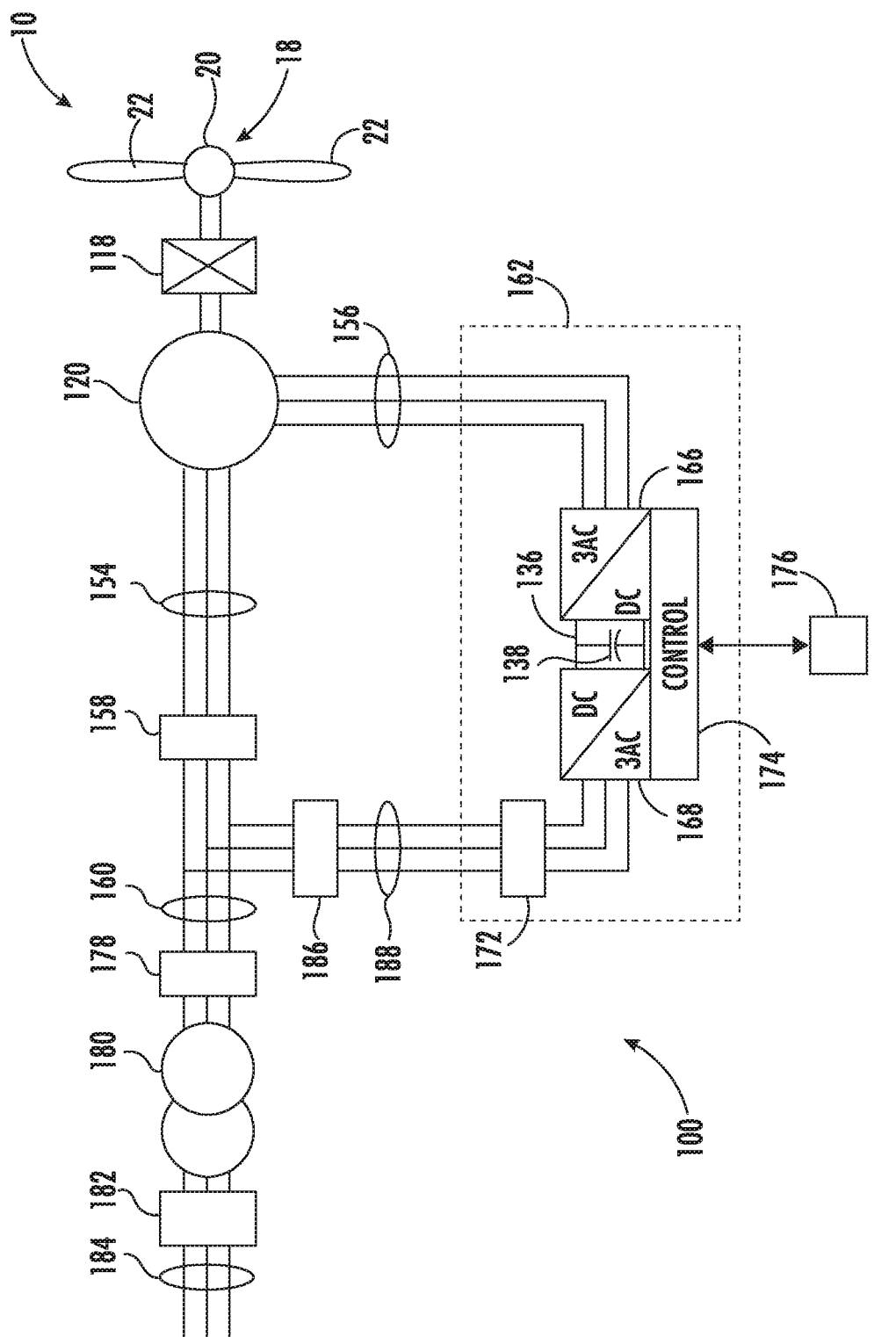
FIG. 2 illustrates a schematic view of one embodiment of a wind turbine electrical power system suitable for use with the wind turbine shown in FIG. 1.

Referring now to FIG. 2, a schematic diagram of one embodiment of a wind turbine DFIG power system 100 ("wind turbine system") is illustrated in accordance with aspects of the present disclosure. Although the present disclosure will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gearbox 118, which is, in turn, coupled to the generator 120, which may be a doubly fed induction generator (DFIG). As shown, the DFIG 120 may be connected to a stator bus 154. Further, as shown, a power converter 162 may be connected to the DFIG 120 via a rotor bus 156, and to the stator bus 154 via a line side bus 188. As such, the stator bus 154 may provide an output multiphase power (e.g. three-phase power) from a stator of the DFIG 120, and the rotor bus 156 may provide an output multiphase power (e.g. three-phase power) from a rotor of the DFIG 120. The power converter 162 may also include a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 may be coupled to a controller 174 in order to control the operation of the rotor side converter 166 and the line side converter 168. It should be noted that the converter controller 174 may be configured as an interface between the power converter 162 and a local wind turbine control system 176 and may include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

As mentioned, for an individual DFIG wind turbine power system 100, the reactive power may be supplied primarily by the RSC 166, via the generator 120 and the LSC 168.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed states or operating characteristics of the wind turbine power system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at the hub 20 and the blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 162, and specifically, the bi-directional characteristics of the LSC 168 and RSC 166, facilitate feeding back at least some of the generated electrical power into generator rotor. More specifically, electrical power may be transmitted from the stator bus 154 to the line side bus 188 and subsequently through the line contactor 172 and into the power converter 162, specifically the LSC 168 which acts as a rectifier and rectifies the sinusoidal, three-phase AC power to DC power. The DC power is transmitted into the DC link 136. The capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power by adjusting voltages, currents, and frequencies. This conversion is monitored and controlled via the converter controller 174. The converted AC power is transmitted from the RSC 166 via the rotor bus 156 to the generator rotor. In this manner, generator reactive power control is facilitated by controlling rotor current and voltage.

Figure 3:
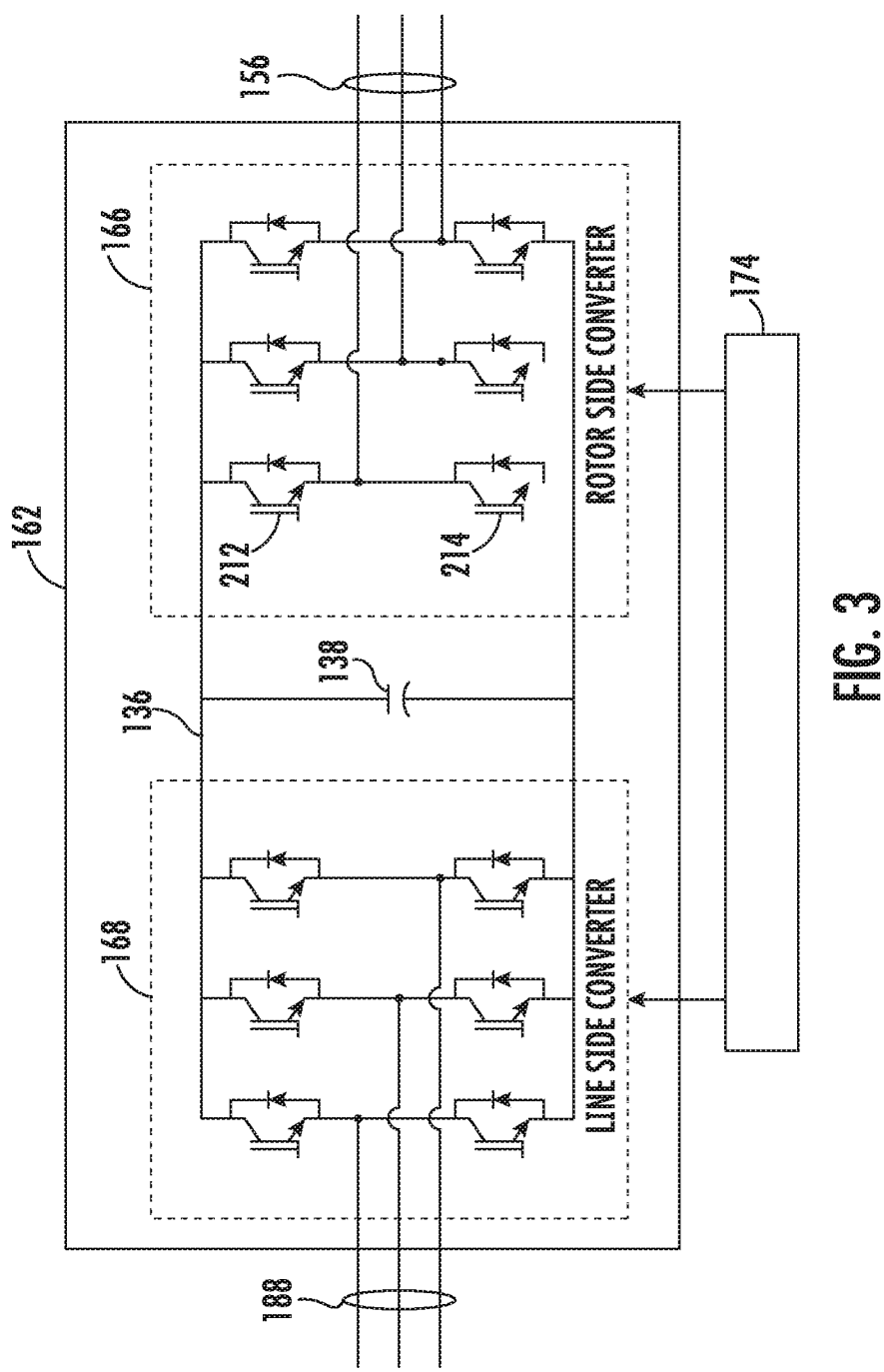
FIG. 3 illustrates a schematic diagram of one embodiment of a power converter of a wind turbine according to the present disclosure.

Referring now to FIG. 3, a detailed, schematic diagram of one embodiment of the power converter shown in FIG. 2 is illustrated in accordance with aspects of the present disclosure. As shown, the RSC 166 includes a plurality of bridge circuits (e.g. H-bridge circuits), with each phase of the rotor bus 156 input to the rotor side converter 166 being coupled to a single bridge circuit. In addition, the LSC 168 may also include a plurality of bridge circuits. Similar to the rotor side converter 166, the line side converter 168 also includes a single bridge circuit for each output phase of the line side converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

Figure 4:
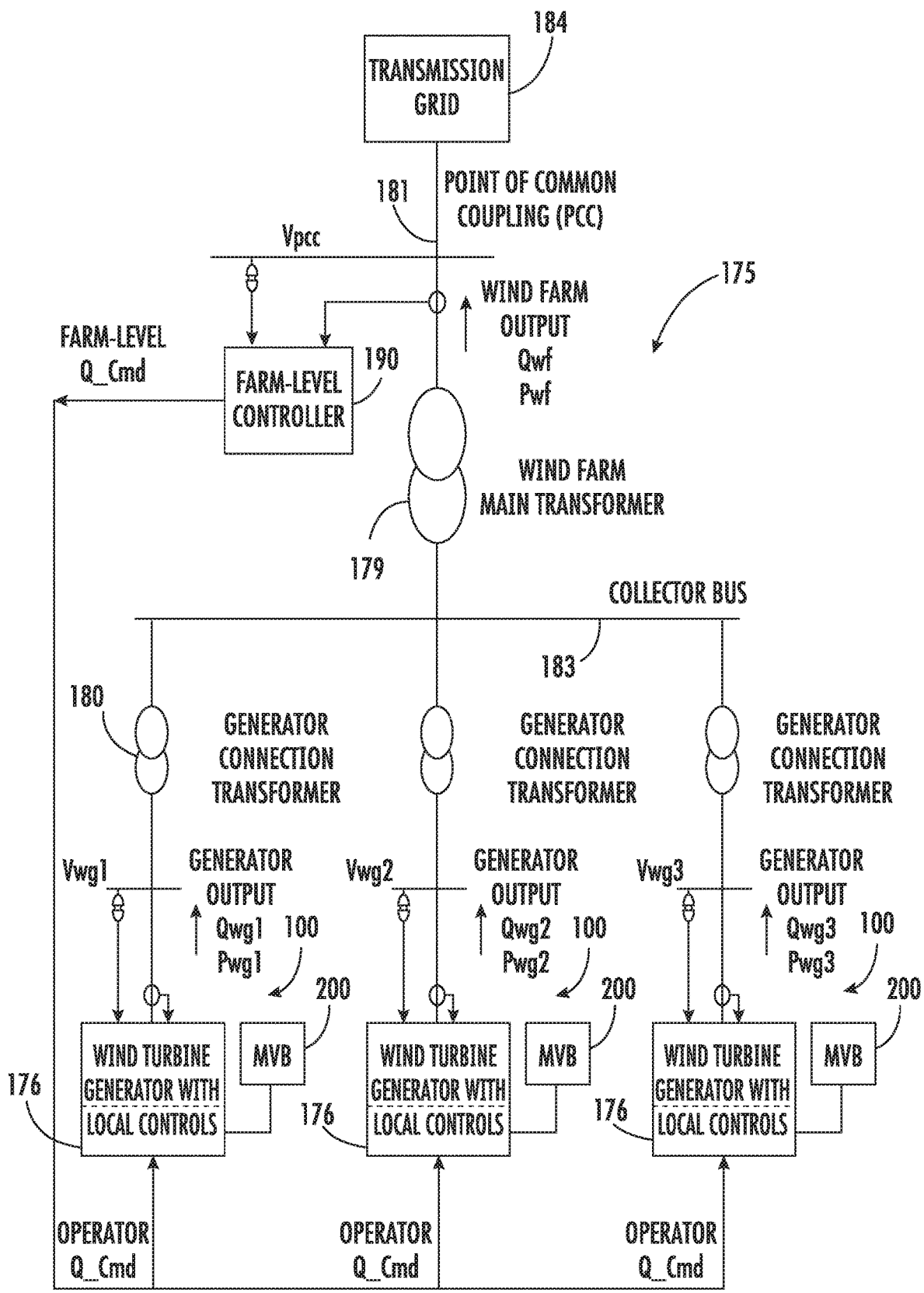
FIG. 4 illustrates a system configuration of one embodiment of a wind farm according to the present disclosure.

Referring generally to FIG. 4, a block diagram of a wind farm 175 having multiple wind turbine systems 100 coupled with a transmission grid 184 is illustrated. For example, as shown, each wind turbine system 100 may include a local controller 176 that is responsive to the states of the wind turbine generator being controlled. In one embodiment, the local controller 176 senses only the terminal voltage and current (via potential and current transformers), which are used by the local controller 176 to provide an appropriate response to cause the wind turbine generator to provide the desired reactive power or power factor and voltage.

Each wind turbine system 100 may be coupled to collector bus 183 through a generator connection transformer 180 to provide real and reactive power (labeled Pwg and Qwg, respectively) to the collector bus 183. Generator connection transformers and collector buses are known in the art.

The wind farm 175 provides farm-level real and reactive power output (labeled Pwf and Qwf, respectively) via wind farm main transformer 179. A farm level controller 190 senses the wind farm output as well as the voltage at a point of common coupling 181 with the grid 184 to provide a farm level reactive power command (Farm-Level Q_Cmd).

A local reactive power command (Operator Q_Cmd) is generated and transmitted to each individual wind turbine system 100 in the wind farm. In one embodiment, the total reactive power demand (Qwf) placed on the wind farm 175 may be essentially equally divided between the wind turbine systems 100 such that the local Operator Q_Cmd command is the same for all of the wind turbine systems 100. In an alternate embodiment, the local Operator Q_Cmd command may be based on an available reactive power value for that wind turbine generator. For example, individual wind turbine generators that are providing relatively more real power (Pwg) may receive relatively smaller individualized Operator Q_Cmd commands, and individual wind turbine generators that are providing relatively less real power Pwg may receive relatively larger individualized Operator Q_Cmd commands. This reduces curtailment of individual wind turbine generators that are providing relatively more real power, thus increasing the real power (Pwf) produced by the wind farm 175 relative to increased farm level reactive power commands (Qwf).

It should be appreciated that the converter controllers 174, local wind turbine controllers 176, and farm level controller 190 may each correspond to any suitable computing device and/or any combination of computing devices. For instance, a controller may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) may generally be configured to store suitable computer-readable instructions that, when implemented by the processor(s), configure the controller to perform various functions, such as the steps disclosed herein.

In the embodiment depicted in FIG. 4, each wind turbine system 100 may also be configured with an individual reactive power compensation device 200 (also referred to as a modular VAR Box (MVB) herein). In additional or alternative embodiments, the reactive power compensation device 200 may also include, for example, the LSC 168, and/or an electrical balance of plant (also referred to as eBOP) at a point of interconnection 181 of the wind farm 175.

Figure 5:
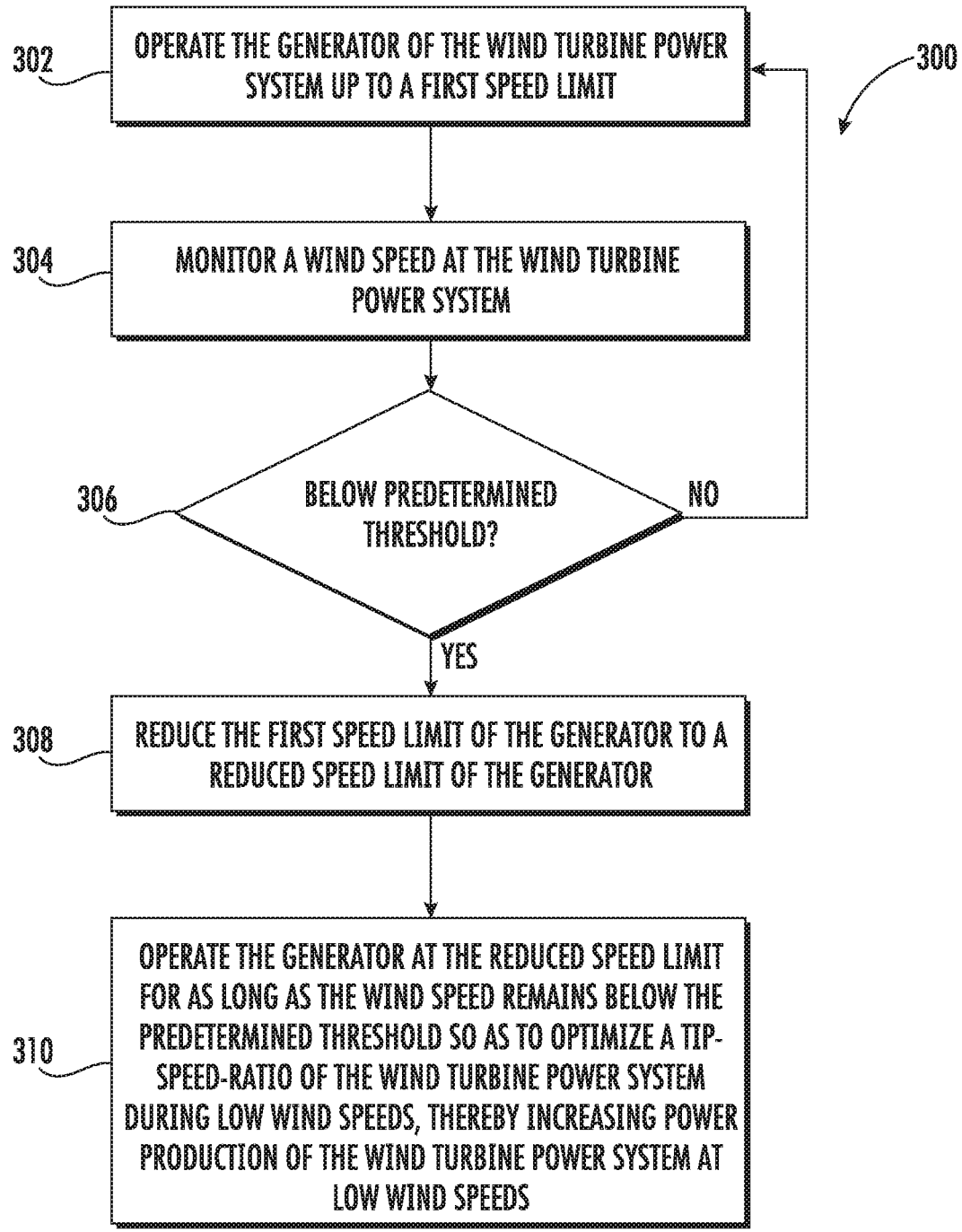
FIG. 5 illustrates a flow diagram of one embodiment of a method for operating a wind turbine power system that supplies real and reactive power to a grid according to the present disclosure.

Referring now to FIG. 5, a flow diagram of an embodiment of a method 300 for operating a wind turbine power system is illustrated in accordance with aspects of the present disclosure. In general, the method 300 is described herein as implemented using, for example, the DFIG wind turbine power system 100 described above. However, it should be appreciated that the disclosed method 300 may be implemented using any other suitable wind power generation system that is configured to supply power, including reactive power, for application to a load, such as a power grid. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (302), the method 300 includes operating the generator of the wind turbine power system 100 up to a first speed limit. As shown at (304), the method 300 includes monitoring a wind speed at the wind turbine power system 100. As shown at (306), the method 300 includes comparing the wind speed to a predetermined threshold. As shown at (308), when the wind speed drops below the predetermined threshold, the method 300 includes reducing the first speed limit of the generator to a reduced speed limit of the generator. If the wind speed remains above the predetermined threshold, operation of the generator remains at the first speed limit. In one embodiment, the predetermined threshold may include wind speeds up to about 5 meters/second (m/s), such as cut-in wind speed from about 3 m/s to about 5 m/s. In another embodiment, the reduced speed limit, for example, may range from about 85% to about 95% of the first speed limit.

As shown at (310), the method 300 operating the generator at the reduced speed limit for as long as the wind speed remains below the predetermined threshold so as to optimize a tip-speed-ratio of the wind turbine power system 100 during low wind speeds, thereby increasing power production of the wind turbine power system 100 at low wind speeds. For example, in certain embodiments, reducing the first speed limit of the generator to the reduced speed limit of the generator increases a power coefficient of the wind turbine power system 100 during the low wind speeds, thereby increasing the power production. In addition, at low wind speeds, the TSR is typically greater than an optimal TSR; therefore, reducing the speed limit of the generator also reduces the TSR to a TSR closer to the optimum value.

In particular embodiments, the first speed limit of the generator may be reduced to the reduced speed limit of the generator by transferring at least a portion of the reactive power to a reactive power compensation device, such as the reactive power compensation device 200 described herein.

Figure 6:
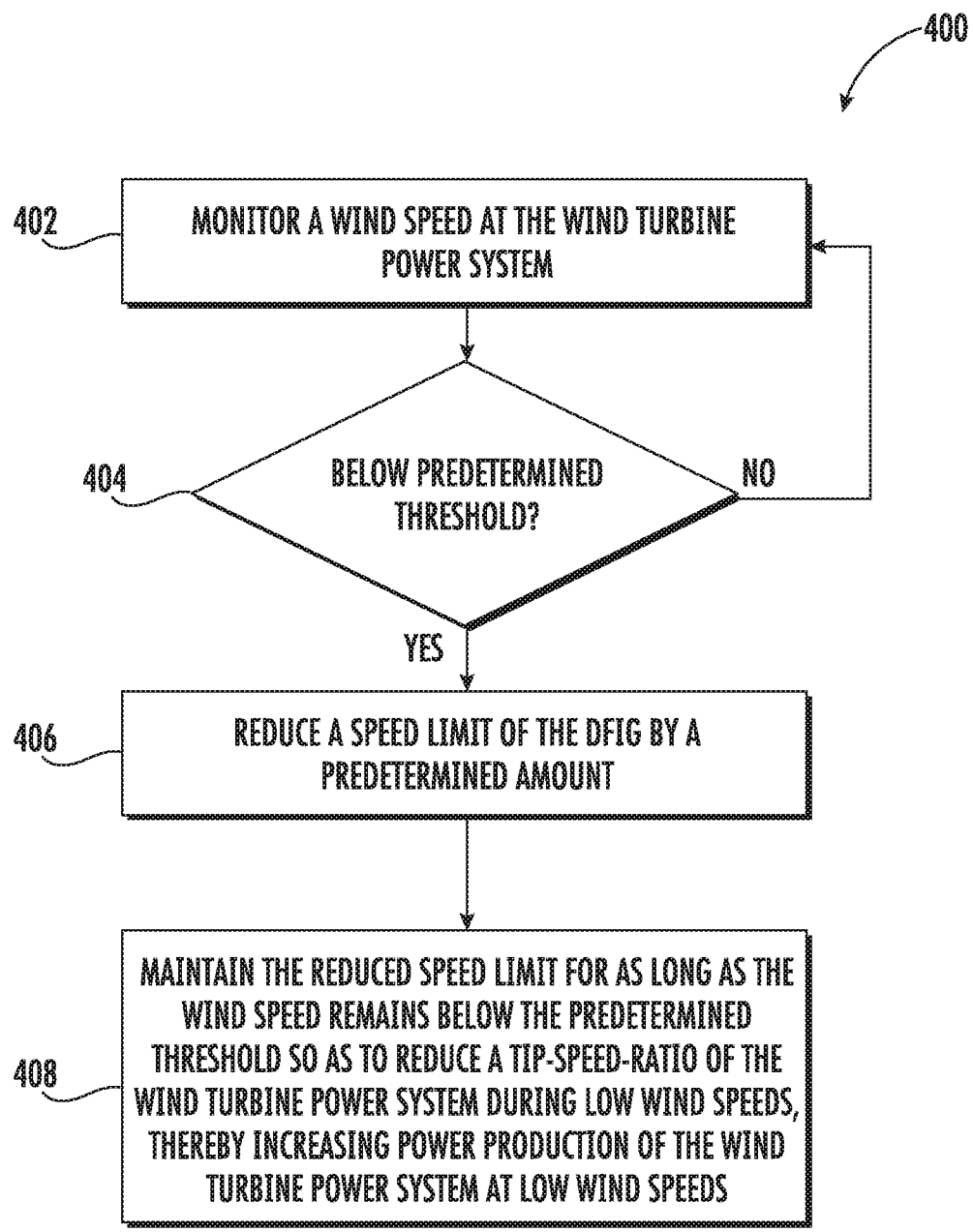
FIG. 6 illustrates a flow diagram of another embodiment of a method for operating a wind turbine power system that supplies real and reactive power to a grid according to the present disclosure.

Referring now to FIG. 6, a flow diagram of an embodiment of a method 400 for operating a wind turbine power system is illustrated in accordance with aspects of the present disclosure. In general, the method 400 is described herein as implemented using, for example, the DFIG wind turbine power system 100 described above. However, it should be appreciated that the disclosed method 400 may be implemented using any other suitable wind power generation system that is configured to supply power, including reactive power, for application to a load, such as a power grid. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (402), the method 400 includes monitoring a wind speed at the wind turbine power system 100. For example, in certain embodiments, the wind speed may be monitored via wind sensor 24. In addition or alternatively, the wind speed may be estimated via the various controllers described herein. As shown at (404), the wind speed is compared to a predetermined threshold. When the wind speed drops below a predetermined threshold, as shown at (406), the method 400 includes reducing a speed limit of the DFIG 120 by a predetermined amount. For example, in certain embodiments, the predetermined amount may range from about 5% to about 15%. Alternatively, if the wind speed remains about the predetermined threshold, the wind speed may be further monitored without any reduction in operating speed. As shown at (408), the method 400 includes maintaining the reduced speed limit for as long as the wind speed remains below the predetermined threshold so as to reduce a tip-speed-ratio of the wind turbine power system 100 during low wind speeds, thereby increasing power production of the wind turbine power system 100 at low wind speeds.

Various aspects and embodiments of the present invention are defined by the following numbered clauses:

Clause 1. A method for operating a wind turbine power system that supplies real and reactive power to a grid, the wind turbine power system including a generator coupled to a power converter, the method comprising:

operating the generator of the wind turbine power system up to a first speed limit;

monitoring a wind speed at the wind turbine power system;

when the wind speed drops below a predetermined threshold, reducing the first speed limit of the generator to a reduced speed limit of the generator; and operating the generator at the reduced speed limit for as long as the wind speed remains below the predetermined threshold so as to optimize a tip-speed-ratio of the wind turbine power system during low wind speeds, thereby increasing power production of the wind turbine power system at low wind speeds.

Clause 2. The method of clause 1, wherein the predetermined threshold comprises wind speeds up to about 5 meters/second (m/s).

Clause 3. The method of any of the preceding clauses, wherein the reduced speed limit ranges from about 85% to about 95% of the first speed limit.

Clause 4. The method of any of the preceding clauses, wherein reducing the first speed limit of the generator to the reduced speed limit of the generator increases a power coefficient of the wind turbine power system during the low wind speeds.

Clause 5. The method of any of the preceding clauses, wherein reducing the first speed limit of the generator to the reduced speed limit of the generator further comprises transferring at least a portion of the reactive power to a reactive power compensation device.

Clause 6. The method of clause 5, wherein the power converter comprises a line-side converter and a rotor-side converter, the reactive power compensation device comprising at least one of the line-side power converter, a VAR box, or an electrical balance of plant at a point of interconnection of the wind turbine power system.

Clause 7. The method of any of the preceding clauses, wherein the generator comprises a doubly fed induction generator (DFIG), the wind turbine power system being one of a plurality of wind turbine power systems within a wind farm that supplies the real and reactive power to the grid.

Clause 8. The method of clause 7, wherein all or a plurality of the wind turbine power systems are connected to a common collection bus within the wind farm.

Clause 9. A wind turbine power system configured to supply real and reactive power to a grid, the wind turbine comprising:
  a wind turbine comprising:
  a rotor comprising a hub and a plurality of blades coupled to the hub,
  a generator coupled to the rotor, and
  a power converter coupled to the generator; and
  a controller for controlling operation of the wind turbine, the controller comprising at least one processor configured to perform a plurality of operations, the plurality of operations comprising:
    operating the generator of the wind turbine up to a first speed limit;
    monitoring a wind speed at the wind turbine;
    when the wind speed drops below a predetermined threshold, reducing the first speed limit of the generator to a reduced speed limit of the generator; and
    operating the generator at the reduced speed limit for as long as the wind speed remains below the predetermined threshold so as to optimize a tip-speed-ratio of the wind turbine during low wind speeds, thereby increasing power production of the wind turbine at low wind speeds.

Clause 10. The wind turbine power system of clause 9, wherein the predetermined threshold comprises wind speeds up to about 5 meters/second (m/s).

Clause 11. The wind turbine power system of clause 9, wherein the reduced speed limit ranges from about 85% to about 95% of the first speed limit.

Clause 12. The wind turbine power system of clause 9, wherein reducing the first speed limit of the generator to the reduced speed limit of the generator increases a power coefficient of the wind turbine during the low wind speeds.

Clause 13. The wind turbine power systems of clause 9, wherein reducing the first speed limit of the generator to the reduced speed limit of the generator further comprises transferring at least a portion of the reactive power to a reactive power compensation device.

Clause 14. The wind turbine power system of clause 13, wherein the power converter comprises a line-side converter and a rotor-side converter, the reactive power compensation device comprising at least one of the line-side power converter, a VAR box, or an electrical balance of plant at a point of interconnection of the wind turbine.

Clause 15. The wind turbine power system of clause 14, wherein the generator comprises a doubly fed induction generator (DFIG), the wind turbine being one of a plurality of wind turbines within a wind farm that supplies the real and reactive power to the grid.

Clause 16. The wind turbine power system of clause 15, wherein all or a plurality of the wind turbines are connected to a common collection bus within the wind farm.

Clause 17. A method for operating a wind turbine power system that supplies real and reactive power to a grid, the wind turbine power system including a doubly fed induction generator (DFIG) coupled to a power converter, the method comprising:
  monitoring a wind speed at the wind turbine power system;
  when the wind speed drops below a predetermined threshold, reducing a speed limit of the DFIG by a predetermined amount;
  maintaining the reduced speed limit for as long as the wind speed remains below the predetermined threshold so as to reduce a tip-speed-ratio of the wind turbine power system during low wind speeds, thereby increasing power production of the wind turbine power system at low wind speeds.

Clause 18. The method of clause 17, wherein the predetermined threshold comprises wind speeds up to about 5 meters/second (m/s).

Clause 19. The method of clauses 17 or 18, wherein the predetermined amount ranges from about 5% to about 15%.

Clause 20. The method of clauses 17, 18, or 19, wherein reducing the speed limit of the DFIG by the predetermined amount further comprises transferring at least a portion of the reactive power to a reactive power compensation device, the reactive power compensation device comprising at least one of the line-side power converter, a VAR box, or an electrical balance of plant at a point of interconnection of the wind turbine.

What is claimed is:

1. A method for operating a wind turbine power system that supplies real and reactive power to a grid, the wind turbine power system including a generator coupled to a power converter, the method comprising:
  operating the generator of the wind turbine power system up to a first speed limit;
  monitoring a wind speed at the wind turbine power system;
  when the wind speed drops below a predetermined threshold, reducing the first speed limit of the generator to a reduced speed limit of the generator, the predetermined threshold being greater than a cut-in wind speed of the wind turbine and less than about 5 meters/second (m/s); and
  operating the generator at the reduced speed limit for as long as the wind speed remains below the predetermined threshold so as to optimize a tip-speed-ratio of the wind turbine power system during low wind speeds, thereby increasing power production of the wind turbine power system at low wind speeds.

2. The method of claim 1, wherein the reduced speed limit ranges from about 85% to about 95% of the first speed limit.

3. The method of claim 1, wherein reducing the first speed limit of the generator to the reduced speed limit of the generator increases a power coefficient of the wind turbine power system during the low wind speeds.

4. The method of claim 1, wherein reducing the first speed limit of the generator to the reduced speed limit of the generator further comprises transferring at least a portion of the reactive power to a reactive power compensation device.

5. The method of claim 4, wherein the power converter comprises a line-side converter and a rotor-side converter, the reactive power compensation device comprising at least one of the line-side power converter, a VAR box, or an electrical balance of plant at a point of interconnection of the wind turbine power system.

6. The method of claim 1, wherein the generator comprises a doubly fed induction generator (DFIG), the wind turbine power system being one of a plurality of wind turbine power systems within a wind farm that supplies the real and reactive power to the grid.

7. The method of claim 6, wherein all or a plurality of the wind turbine power systems are connected to a common collection bus within the wind farm.

8. A wind turbine power system configured to supply real and reactive power to a grid, the wind turbine power system comprising:
    a wind turbine comprising:
        a rotor comprising a hub and a plurality of blades coupled to the hub,
        a generator coupled to the rotor, and
        a power converter coupled to the generator; and
    a controller for controlling operation of the wind turbine, the controller comprising at least one processor configured to perform a plurality of operations, the plurality of operations comprising:
        operating the generator of the wind turbine up to a first speed limit;
        monitoring a wind speed at the wind turbine;
        when the wind speed drops below a predetermined threshold, reducing the first speed limit of the generator to a reduced speed limit of the generator, wherein the reduced speed limit ranges from about 85% to about 95% of the first speed limit; and
        operating the generator at the reduced speed limit for as long as the wind speed remains below the predetermined threshold so as to optimize a tip-speed-ratio of the wind turbine during low wind speeds, thereby increasing power production of the wind turbine at low wind speeds.

9. The wind turbine power system of claim 8, wherein the predetermined threshold comprises wind speeds up to about 5 meters/second (m/s).

10. The wind turbine power system of claim 8, wherein reducing the first speed limit of the generator to the reduced speed limit of the generator increases a power coefficient of the wind turbine during the low wind speeds.

11. The wind turbine power system of claim 8, wherein reducing the first speed limit of the generator to the reduced speed limit of the generator further comprises transferring at least a portion of the reactive power to a reactive power compensation device.

12. The wind turbine power system of claim 11, wherein the power converter comprises a line-side converter and a rotor-side converter, the reactive power compensation device comprising at least one of the line-side power converter, a VAR box, or an electrical balance of plant at a point of interconnection of the wind turbine.

13. The wind turbine power system of claim 12, wherein the generator comprises a doubly fed induction generator (DFIG), the wind turbine being one of a plurality of wind turbines within a wind farm that supplies the real and reactive power to the grid.

14. The wind turbine power system of claim 13, wherein all or a plurality of the wind turbines are connected to a common collection bus within the wind farm.

15. A method for operating a wind turbine power system that supplies real and reactive power to a grid, the wind turbine power system including a doubly fed induction generator (DFIG) coupled to a power converter, the method comprising:
    monitoring a wind speed at the wind turbine power system;
    when the wind speed drops below a predetermined threshold, reducing a speed limit of the DFIG by a predetermined amount;
    maintaining the reduced speed limit for as long as the wind speed remains below the predetermined threshold so as to reduce a tip-speed-ratio of the wind turbine power system during low wind speeds, thereby increasing power production of the wind turbine power system at low wind speeds,
    wherein reducing the speed limit of the DFIG by the predetermined amount further comprises transferring at least a portion of the reactive power to a reactive power compensation device.

16. The method of claim 15, wherein the predetermined threshold comprises wind speeds up to about 5 meters/second (m/s).

17. The method of claim 15, wherein the predetermined amount ranges from about 5% to about 15%.

18. The method of claim 15, wherein the reactive power compensation device comprises at least one of the line-side power converter, a VAR box, or an electrical balance of plant at a point of interconnection of the wind turbine.

* * * * *